United States Patent
Matsukawa et al.

(10) Patent No.: US 8,603,626 B2
(45) Date of Patent: Dec. 10, 2013

(54) DECORATIVE SHEET FOR THREE-DIMENSIONAL WORK

(75) Inventors: Ayao Matsukawa, Fukushima (JP); Nobuo Saitou, Saitama (JP); Masayoshi Tanaka, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 398 days.

(21) Appl. No.: 12/921,681

(22) PCT Filed: Mar. 12, 2008

(86) PCT No.: PCT/JP2008/054525
§ 371 (c)(1), (2), (4) Date: Nov. 9, 2010

(87) PCT Pub. No.: WO2009/113168
PCT Pub. Date: Sep. 17, 2009

(65) Prior Publication Data
US 2011/0045284 A1   Feb. 24, 2011

(51) Int. Cl.
*B32B 27/32* (2006.01)
*B32B 9/04* (2006.01)
*B32B 27/36* (2006.01)
*B32B 27/00* (2006.01)

(52) U.S. Cl.
USPC ........ 428/336; 428/220; 428/411.1; 428/412; 428/500

(58) Field of Classification Search
None
See application file for complete search history.

(56) References Cited

U.S. PATENT DOCUMENTS

| | | | |
|---|---|---|---|
| 6,984,440 B2 * | 1/2006 | Saito et al. | 428/195.1 |
| 8,097,317 B2 * | 1/2012 | Katou et al. | 428/35.7 |
| 2001/0046594 A1 | 11/2001 | Takemoto | |

FOREIGN PATENT DOCUMENTS

| | | |
|---|---|---|
| JP | 2000 202975 | 7/2000 |
| JP | 2007 290392 | 11/2007 |
| JP | 2007 291380 | 11/2007 |
| JP | 2007 291381 | 11/2007 |

OTHER PUBLICATIONS

International Search Report issued Jun. 24, 2008 in PCT/JP08/054525 filed Mar. 12, 2008.
Extended European Search Report issued Dec. 19, 2012 in European Patent Application No. 08721941.6.
"Deflection Temperature Testing of Plastics", MatWeb Material Property Data, URL:http://www.matweb.com/reference/deflection-temperature.aspx, XP002547243, 1996, pp. 1-2.
"Standard Test Method for Deflection Temperature of Plastics Under Flexural Load in the Edgewise Position", Annual Book of ASTM Standards, ASTM D 648-07, Section 8, vol. 08.01, XP9165546, 2009, pp. 66-78 (plus cover page).

\* cited by examiner

*Primary Examiner* — Sheeba Ahmed
(74) *Attorney, Agent, or Firm* — Oblon, Spivak, McClelland, Maier & Neustadt, L.L.P.

(57) ABSTRACT

A decorative sheet for three-dimensional processing having a support and at least a surface protective layer laminated thereon, where the decorative sheet for three-dimensional processing has a breaking elongation (according to JIS K 7127) exceeding 300% at temperature higher by 40° C. than a thermal deformation temperature of the above support measured by an ASTM D648 method, and the above surface protective layer is obtained by cross-linking and curing an ionizing radiation curable resin composition and has a film thickness of 0.2 to 6.0 μm.

17 Claims, 3 Drawing Sheets

DECORATIVE SHEET FOR THREE-DIMENSIONAL WORK

BACKGROUND OF THE INVENTION

The present invention relates to a decorative sheet for three-dimensional processing used for decorative molded matters in uses such as interior materials or exterior materials for vehicles such as cars, fixture members such as base boards, dressed lumbers and the like, fittings for window frames, door frames and the like, interior materials for buildings such as walls, floors, ceilings and the like, housings for home electric appliances such as TV receivers, air conditioners and the like, vessels and the like.

RELATED ART

Decorative molded matters produced by molding sheets obtained by decorating the surfaces of adherends such as resin molded matters and the like have so far been used for various applications. Decorative molded matters having surfaces decorated by the above decorative sheet molding method are obtained. Accordingly, a decorative sheet used for the above production method is decorated after extending a sheet, and therefore not only such molding performance that cracks and the like are not produced on the surface in molding is required, but also the abrasion resistance, the solvent resistance and the like are required to be excellent as well from a viewpoint in uses of the molded matters.

Proposed in, for example, a patent document 1 is a laminated sheet for covering a surface of an injection molded matter which is obtained by laminating a clear cured layer of a cross-linkable composition having a specific glass transition temperature and a specific cross-linking density on a sheet-shaped substrate of a thermoplastic resin and which has a breaking elongation of 30 to 300%.

However, the existing situation is that a breaking elongation of 30 to 300% is not satisfactory in order to prevent a decorative sheet from being cracked in three-dimensional processing and that a sheet which can be stretched by 300% or more is inferior in die release and inferior as well in an abrasion resistance and a solvent resistance.

Accordingly, a molding property in three-dimensional processing, die release, an abrasion resistance, a solvent resistance and the like are required to be further improved.

Patent document 1: Japanese Patent Application Laid-Open No. 202975/2000

DISCLOSURE OF THE INVENTION

In light of the above situation, an object of the present invention is to provide a decorative sheet for three-dimensional processing which is improved in a molding property and has good die release and does not produce cracks and scratches on a surface in molding and which is improved as well in an abrasion resistance and a solvent resistance.

Intensive researches repeated by the present inventors in order to achieve the object described above have resulted in finding that the object can be achieved by improving the surface protective layer. The present invention has been completed based the above knowledge.

That is, the present invention comprises the following essential points.

1. A decorative sheet for three-dimensional processing comprising a support and at least a surface protective layer laminated thereon, wherein the above decorative sheet for three-dimensional processing has a breaking elongation (according to JIS K 7127) exceeding 300% at temperature higher by 40° C. than a thermal deformation temperature of the above support measured by an ASTM D648 method, and the above surface protective layer is obtained by cross-linking and curing an ionizing radiation curable resin composition and has a film thickness of 0.2 to 6.0 µm.
2. The decorative sheet for three-dimensional processing as described in the above item 1, wherein the above surface protective layer has a storage elastic modulus falling in a range of $7.7 \times 10^5$ to $1.2 \times 10^8$ Pa at 140° C. which is measured on measuring conditions shown below:
measuring conditions of the storage elastic modulus: a sheet having a width of 10 mm and a thickness of 15 µm produced by cross-linking and curing the above ionizing radiation curable resin composition is measured at a cramp-to-cramp distance of 10 mm, an initiating temperature of 30° C., a terminating temperature of 180° C., a heating rate of 5° C./minute and a measuring frequency of 1 Hz according to JIS K7244-1 and K7244-4.
3. The decorative sheet for three-dimensional processing as described in the above item 1 or 2, wherein the ionizing radiation curable resin composition is a resin composition comprising an ionizing radiation curable resin and a thermoplastic resin in a ratio (weight ratio) of 75:25 to 20:80.
4. The decorative sheet for three-dimensional processing as described in any of the above items 1 to 3, wherein a transparent thermoplastic resin layer is further provided between the support and the surface protective layer.
5. The decorative sheet for three-dimensional processing as described in the above item 4, wherein a second thermoplastic resin layer is further provided between the support and the transparent thermoplastic resin layer.
6. The decorative sheet for three-dimensional processing as described in any of the above items 3 to 5, wherein the above ionizing radiation curable resin composition is an electron beam curable resin.
7. The decorative sheet for three-dimensional processing as described in any of the above items 1 to 6, wherein the three-dimensional processing is insert molding.
8. A decorative resin molded matter integrated with the decorative sheet for three-dimensional processing as described in any of the above items 1 to 7.

The decorative sheet for three-dimensional processing according to the present invention is excellent in a molding property and die release, does not produce cracks and scratches on a surface in molding and has a high abrasion resistance and a high solvent resistance.

EXPLANATION OF THE CODES

Figure 1:
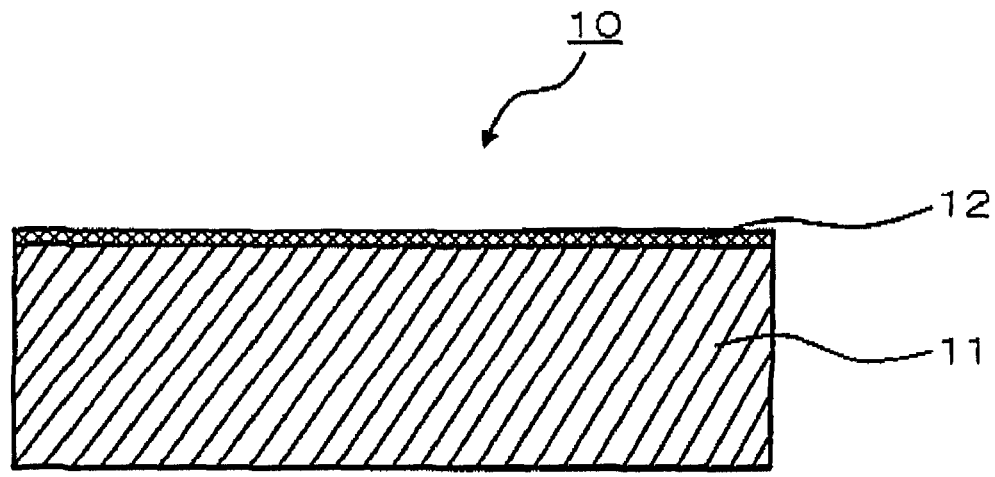
FIG. 1 is a schematic drawing showing a cross section of the embodiment of the decorative sheet for three-dimensional processing according to the present invention.

10 Decorative sheet
11 Support

12 Surface protective layer
13 Transparent thermoplastic resin layer
14 Second thermoplastic resin layer
15 print layer
16 Adhesive layer
17 Primer layer

BEST MODE FOR CARRYING OUT THE INVENTION

The present invention shall be explained below with reference to the drawings. FIG. 1 is a schematic drawing showing a cross section of the embodiment of the decorative sheet for three-dimensional processing according to the present invention.

A decorative sheet 10 for three-dimensional processing according to the present invention comprises a support 11 and at least a surface protective layer 12 laminated thereon.

An elongation property of the decorative sheet 10 of the present invention is affected to a large extent by an elongation property of the support 11. Accordingly, the decorative sheet 10 has to have a breaking elongation exceeding 300% at temperature higher by 40° C. than a thermal deformation temperature of the support 11 measured by an ASTM D648 method. This is because in three-dimensional processing of a complicated form, the decorative sheet 10 is prevented from being cracked or broken on a surface. The breaking elongation is preferably 380% or more from the above point of view. Also, it is preferably 500% or less because of the reasons that the required film thickness can be secured even after stretched and that the form holding property is improved. The support 11 used for the decorative sheet 10 of the present invention may comprise either a single layer or plural layers.

The surface protective layer 12 provided on the decorative sheet 10 of the present invention has to have a film thickness of 0.2 to 6.0 μm. If the film thickness is less than 0.2 μm, the abrasion resistance and the solvent resistance are reduced, and if it exceeds 6.0 μm, the molding property, the breaking elongation and the abrasion resistance are reduced. The film thickness is preferably 0.7 to 6.0 μm from the above point of view.

FIG. 2 to FIG. 5 are schematic drawings showing the cross sections of another embodiments of the decorative sheet for three-dimensional processing according to the present invention. However, the decorative sheet for three-dimensional processing shall not be restricted to the above embodiments.

Figure 2:
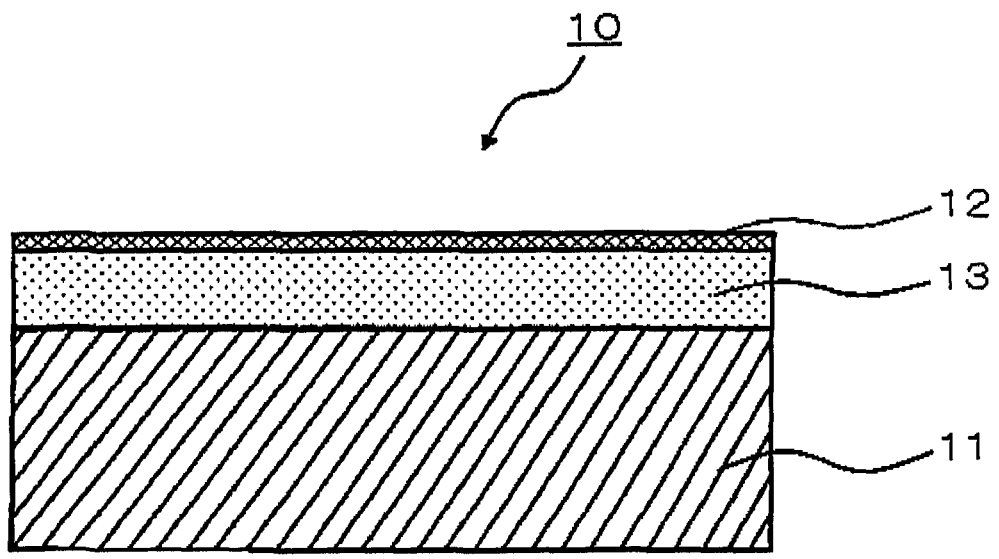
FIG. 2 is a schematic drawing showing a cross section of another embodiment of the decorative sheet for three-dimensional processing according to the present invention.

In the second embodiment of the decorative sheet 10 of the present invention shown in FIG. 2, a transparent thermoplastic resin layer 13 is further provided between the support 11 and the surface protective layer 12.

Figure 3:
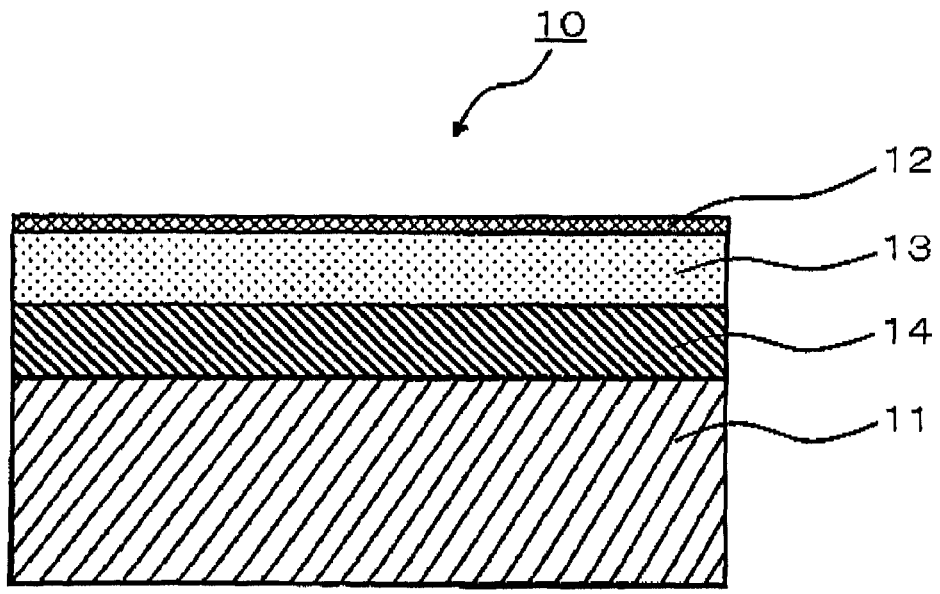
FIG. 3 is a schematic drawing showing a cross section of another embodiment of the decorative sheet for three-dimensional processing according to the present invention.

In the third embodiment of the decorative sheet 10 of the present invention shown in FIG. 3, a second thermoplastic resin layer 14 is further provided between the support 11 and the transparent thermoplastic resin layer 13.

Figure 4:
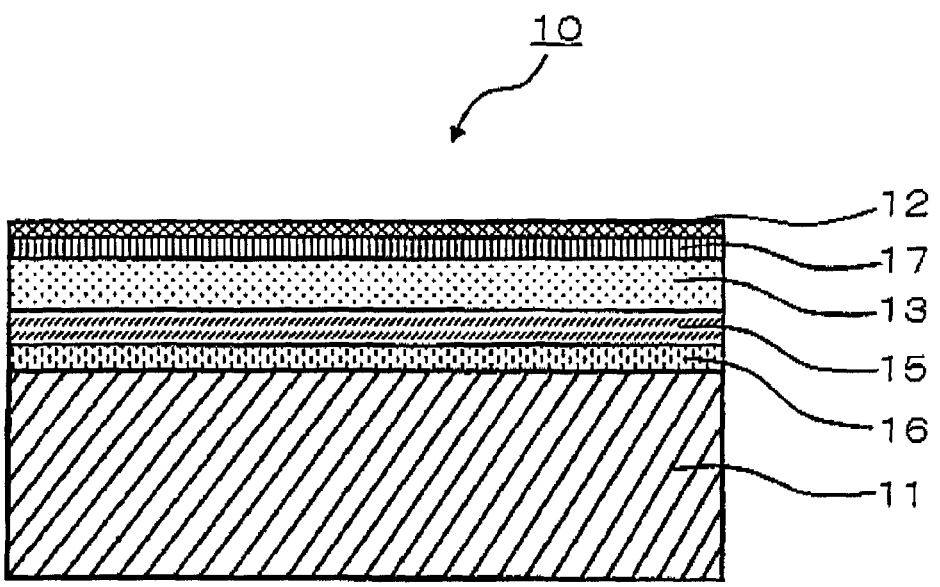
FIG. 4 is a schematic drawing showing a cross section of another embodiment of the decorative sheet for three-dimensional processing according to the present invention.

In the fourth embodiment of the decorative sheet 10 of the present invention shown in FIG. 4, an adhesive layer 16, a print layer 15, a transparent thermoplastic resin layer 13, a primer layer 17 and a surface protective layer 12 are laminated on a support 11. In this regard, the print layer 15 may be laminated on either a front side or a back side of the transparent thermoplastic resin layer 13 or may be laminated on the surface of the support 11.

Figure 5:
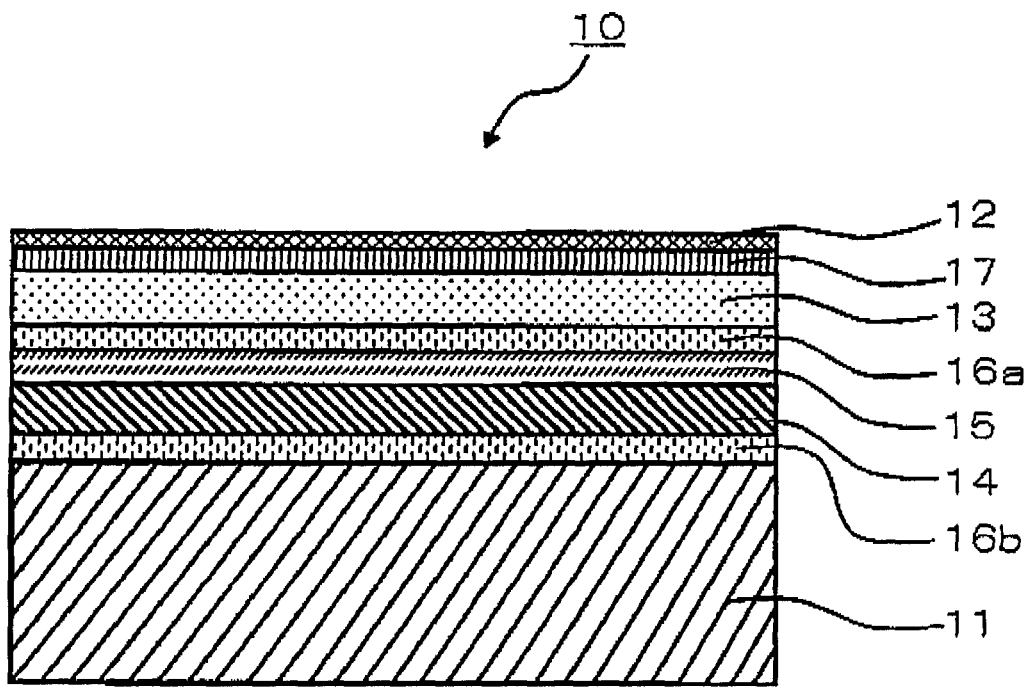
FIG. 5 is a schematic drawing showing a cross section of another embodiment of the decorative sheet for three-dimensional processing according to the present invention.

In the fifth embodiment of the decorative sheet 10 of the present invention shown in FIG. 5, an adhesive layer 16b, a second thermoplastic resin layer 14, a print layer 15, an adhesive layer 16a, a transparent thermoplastic resin layer 13, a primer layer 17 and a surface protective layer 12 are laminated on a support 11. In this regard, the print layer 15 may be laminated on either a front side or a back side of the transparent thermoplastic resin layer 13. When the second thermoplastic resin layer 14 is transparent or translucent, the print layer 15 may be laminated on a surface of the support 11 or a back side of the second thermoplastic resin layer 14. The adhesive layers 16a and 16b may be formed by using the same material or different materials.

The surface protective layer 12 according to the present invention has to be formed by cross-linking and curing an ionizing radiation curable resin composition in order to fulfill a surface protective performance of an abrasion resistance and a solvent resistance. In this respect, the ionizing radiation curable resin means a resin which is cross-linked and cured by irradiating with a ray having an energy quantum capable of cross-linking and curing molecules among electromagnetic waves or charged particle beams, that is, a UV ray or an electron beam. To be specific, resins suitably selected from polymerizable monomers, polymerizable oligomers and prepolymers which have so far conventionally been used as ionizing radiation curable resins.

The surface protective layer 12 according to the present invention has preferably a storage elastic modulus falling in a range of $7.7 \times 10^5$ to $1.2 \times 10^8$ Pa. If the storage elastic modulus is $1.2 \times 10^8$ Pa or less, molding can be carried out without producing cracks on the surface protective layer in vacuum molding. When the resin is a cross-linking type, the higher the storage elastic modulus in a rubber state is, the lower the average inter-cross-linking point molecular weight is, that is, the cross-linking density is high, and therefore the abrasion resistance and the solvent resistance on the surface are enhanced. Accordingly, if the storage elastic modulus falls in the above range, obtained is a decorative sheet which is balanced to such an extent that a molding property and an abrasion resistance on a surface after forming a surface protective layer are satisfactory at a high level.

The polymerizable monomers used as ionizing radiation curable resins are suitably (meth)acrylate base monomers having a radically polymerizable unsaturated group in a molecule, and among them, two or higher multifunctional (meth)acrylates are preferred. In this case, "(meth)acrylate" means "acrylate" and "methacrylate", and other similar monomers have the same meaning. The multifunctional (meth)acrylates shall not specifically be restricted as long as they have two or more ethylenically unsaturated bonds in a molecule. To be specific, they include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentanyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, pentaerythritol ethoxytetra(meth)acrylate, ditrimethylolpropane tetra(meth)acrylate, pentaerythritol tetra(meth)acrylate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)

acrylate and the like. The above multifunctional (meth)acrylates may be used alone or in combination of two or more kinds thereof.

In the present invention, monofunctional (meth)acrylates can suitably be used in combination with the multifunctional (meth)acrylate described above for the purpose of reducing a viscosity of the multifunctional (meth)acrylate as long as the effects of the present invention are not damaged. The monofunctional (meth)acrylates include, for example, methyl (meth)acrylate, ethyl(meth)acrylate, propyl(meth)acrylate, butyl(meth)acrylate, pentyl(meth)acrylate, hexyl(meth)acrylate, cyclohexyl(meth)acrylate, 2-ethylhexyl(meth)acrylate, lauryl(meth)acrylate, stearyl(meth)acrylate, isobornyl(meth)acrylate and the like. The above monofunctional (meth)acrylates may be used alone or in combination of two or more kinds thereof.

Next, the polymerizable oligomers include oligomers having radically polymerizable unsaturated groups in a molecule (difunctional, trifunctional, tetrafunctional or higher multifunctional oligomers), for example, epoxy(meth)acrylate base oligomers, urethane(meth)acrylate base oligomers, polyester(meth)acrylate base oligomers, polyether(meth)acrylate base oligomers and the like. In this respect, the epoxy (meth)acrylate base oligomers can be obtained, for example, by reacting an oxirane ring of a relatively low molecular weight bisphenol type epoxy resin or novolak type epoxy resin with (meth)acrylic acid to esterify it. Further, capable of being used as well are carboxyl-modified epoxy (meth)acrylate oligomers obtained by partially modifying the above epoxy(meth)acrylate base oligomers with dibasic carboxylic anhydrides. The urethane(meth)acrylate base oligomers can be obtained, for example, by reacting polyetherpolyols or polyesterpolyols with polyisocyanates to obtain polyurethane oligomers and esterifying the polyurethane oligomers thus obtained with (meth)acrylic acid. The polyester (meth)acrylate base oligomers can be obtained, for example, by condensing polyvalent carboxylic acids with polyhydric alcohols to obtain polyester oligomers having hydroxyl groups at both ends and esterifying the hydroxyl groups of the polyester oligomers thus obtained with (meth)acrylic acid, or by adding alkylene oxides to polyvalent carboxylic acids to obtain oligomers and esterifying hydroxyl group of the oligomers thus obtained at an end with (meth)acrylic acid. The polyether(meth)acrylate base oligomers can be obtained, for example, by esterifying hydroxyl groups of polyetherpolyols with (meth)acrylic acid.

Further, the polymerizable oligomers include, in addition to the above compounds, polybutadiene(meth)acrylate base oligomers having a high hydrophobic property in which a polybutadiene oligomer has a (meth)acrylate group on a side chain, silicone(meth)acrylate base oligomers having a polysiloxane bond on a main chain, aminoplast resin (meth)acrylate base oligomers obtained by modifying an aminoplast resin having a large number of reactive groups in a small molecule thereof and oligomers having a cationically polymerizable functional group in a molecule such as novolak type epoxy resins, bisphenol type epoxy resins, aliphatic vinyl ethers, aromatic vinyl ethers and the like.

When a UV-curable resin is used as the ionizing radiation-curable resin, a photopolymerization initiator is preferably added thereto in an amount of about 0.1 to 5 weight parts per 100 weight parts of the resin. The photopolymerization initiator shall not specifically be restricted and can suitably be selected from conventionally used compounds. The photopolymerization initiator used for polymerizable monomers or polymerizable oligomers having radically polymerizable unsaturated groups in molecules thereof include, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and the like.

The photopolymerization initiator used for polymerizable oligomers having cationically polymerizable functional groups in molecules thereof include aromatic sulfonium salts, aromatic diazonium salts, aromatic iodonium salts, metallocene compounds, benzoin sulfonic esters and the like.

Also, p-dimethylbenzoic esters, tertiary amines, thiol base sensitizers and the like can be used as a photosensitizer.

An electron beam-curable resin composition is preferably used as the ionizing radiation-curable resin composition according to the present invention. The electron beam-curable resin composition can be used in the absence of a solvent and is more preferred from the viewpoint of environmental protection and human health. Further, it does not require a photopolymerization initiator and provides a stable curing property.

In the present invention, the ionizing radiation-curable resin composition is preferably a resin composition comprising an ionizing radiation-curable resin and a thermoplastic resin in a ratio (weight ratio) of 75:25 to 20:80. If the ratio falls in the above range, the molding property, the abrasion resistance and the solvent resistance after cross-linked and cured to form the surface protective layer are well balanced. From this point of view, a weight ratio of the ionizing radiation-curable resin to the thermoplastic resin falls in a range of more preferably 60:40 to 20:80, particularly preferably 60:40 to 25:75.

The thermoplastic resin used for the ionizing radiation-curable resin composition according to the present invention includes (meth)acryl base resins such as poly-(meth)acrylic acid esters and the like, polyvinyl acetal (butyral resins) such as polyvinyl butyral and the like, polyester resins such as polyethylene terephthalate, polybutylene terephthalate and the like, vinyl chloride resins, urethane resins, polyolefins such as polyethylene, polypropylene and the like, styrene base resins such as polystyrene, poly-α-methylstyrene, polyamide, polycarbonate, acetal resins such as polyoxymethylene and the like, fluororesins such as ethylene-ethylene tetrafluoride copolymers and the like, polyimide, polylactic acid, polyvinyl acetal resins, liquid crystalline polyester resins and the like. They may be used alone or in combination of two or more kinds thereof. When used in combination of two or more kinds thereof, they may be copolymers of monomers constituting the above resins, or the mixtures of the respective resins may be used.

Among the thermoplastic resins described above, resins comprising (meth)acryl base resins as principal components are preferred in the present invention, and among them, resins obtained by polymerizing monomers comprising at least (meth)acrylic esters as a monomer component are preferred.

To be more specific, homopolymers of (meth)acrylic esters, copolymers of two or more kinds of different (meth)

acrylic ester monomers and copolymers of (meth)acrylic esters with other monomers are preferred.

In this connection, the (meth)acrylic esters include, for example, methyl acrylate, methyl methacrylate, ethyl acrylate, ethyl methacrylate, propyl acrylate, propyl methacrylate and the like. Among them, methyl methacrylate is most preferred.

Next, copolymers of two or more kinds of (meth)acrylic ester monomers selected from the above monomers shown as the examples are shown as the examples of the copolymers of two or more kinds of different (meth)acrylic ester monomers. Also in the above copolymers, the monomers comprising methyl methacrylate as a principal component are preferred. That is, the copolymers of methyl methacrylate with other (meth)acrylic ester monomers are preferred, and the copolymers of methyl methacrylate with methyl acrylate, the copolymers of methyl methacrylate with ethyl methacrylate and the like are shown as the examples thereof. Among them, particularly the copolymers of methyl methacrylate with methyl acrylate are most preferred from the viewpoint of effects. The above copolymers may be either random copolymers or block copolymers.

In the copolymers of methyl methacrylate with the other (meth)acrylic ester monomers, a constitutional unit originating in the other methacrylic ester monomers falls preferably in a range of 0.1 to 200 mole based on 100 mole of a constitutional unit originating in methyl methacrylate. If the constitutional unit originating in the other methacrylic ester monomers falls in the range described above based on 100 mole of the constitutional unit originating in methyl methacrylate, the abrasion resistance and the solvent resistance are improved.

Next, the other monomers in the copolymers of (meth)acrylic esters with the other monomers shall not specifically be restricted as long as they can be copolymerized with (meth)acrylic esters. In the present invention, they include (meth)acrylic acid, styrene, (anhydrous) maleic acid, fumaric acid, divinylbenzene, vinylbiphenyl, vinylnaphthalene, diphenylethylene, vinyl acetate, vinyl chloride, vinyl fluoride, vinyl alcohol, acrylonitrile, acrylamide, butadiene, isoprene, isobutene, 1-butene, 2-butene, alicyclic olefin monomers such as N-vinyl-2-pyrrolidone, dicyclopentadiene, ethylidenenorbornene, norbornenes and the kike, vinylcaprolactum, citraconic anhydride, maleimides such as N-phenylmaleimide, vinyl ethers and the kike. In particular, styrene and (anhydrous)maleic acid are suited as the copolymerization components. That is, suited are the binary copolymers of (meth)acrylic esters with styrene or(anhydrous) maleic acid and the ternary copolymers of (meth)acrylic esters with styrene and (anhydrous)maleic acid.

The copolymers of (meth)acrylic esters with the other monomers may be either random copolymers or block copolymers.

In the copolymers of (meth)acrylic esters with styrene and/or (anhydrous)maleic acid, a constitutional unit originating in styrene and/or (anhydrous)maleic acid falls preferably in a range of 0.1 to 200 mole based on 100 mole of a constitutional unit originating in the (meth)acrylic esters. If the constitutional unit originating in styrene and/or (anhydrous) maleic acid falls in the range described above based on 100 mole of the constitutional unit originating in the (meth) acrylic esters, the abrasion resistance and the solvent resistance are improved as well.

The (meth)acryl base resin described above has a weight average molecular weight falling preferably in a range of 60,000 to 150,000. If the weight average molecular weight falls in the above range, all of the molding property and the abrasion resistance and the solvent resistance on the surface after cross-linked and cured to form the surface protective layer can be obtained at high levels.

In this connection, the weight average molecular weight was measured by gel permeation chromatography (GPC). A high speed GPC apparatus manufactured by Tosoh Corp. was used for the measurement, wherein a column TSK gel αM (trade name) manufactured by Tosoh Corp. was used; N-methyl-2-pyrrolidinone (NMP) was used for a solvent; and measurement was carried out at a column temperature of 40° C. and a flow rate of 0.5 ml/minute. The molecular weight and the molecular weight distribution were reduced to polystyrene.

The ionizing radiation-curable resin composition according to the present invention can be blended with various additives according to the required physical properties of the cured resin layer obtained. The above additives include, for example, weatherability improving agents, abrasion resistance improving agents, polymerization inhibitors, cross-linking agents, IR absorbing agents, antistatic agents, adhesion improving agents, leveling agents, thixotropic agents, coupling agents, plasticizers, defoaming agents, fillers, solvents, colorants and the like.

In this respect, UV absorbing agents and light stabilizers can be used as the weatherability improving agent. The UV absorbing agents may be either inorganic or organic compounds. Titanium oxide, cerium oxide and zinc oxide each having an average particle diameter of 5 to 120 nm can be used as the inorganic UV absorbing agent. The organic UV absorbing agent includes, for example, benzotriazole base compounds, to be specific, 2-(2-hydroxy-5-methylphenyl) benzotriazole, 2-(2-hydroxy-3,5-di-tert-amylphenyl)benzotriazole, 3-[3-(benzotriazole-2-yl)-5-tert-butyl-4-hydroxyphenyl]propionic ester of polyethylene glycol and the like. On the other hand, the light stabilizer include, for example, hindered amine base compounds, to be specific, bis(1,2,2,6, 6-pentamethyl-4-piperizyl) 2-(3,5-di-tert-butyl-4-hydroxybenzyl)-2'-n-butylmalonate, bis(1,2,2,6,6-pentamethyl-4-piperidyl) sebacate, tetrakis(2,2,6,6-tetramethyl-4-piperidyl)-1,2,3,4-butanetetracarboxylate and the like. Further, reactive UV absorbing agents and light stabilizers having polymerizable groups such as a (meth)acryloyl group in molecules thereof can also be used as the UV absorbing agent and the light stabilizer.

The abrasion resistance improving agent includes, for example, in the case of the inorganic compounds, spherical particles of α-alumina, silica, kaolinite, iron oxide, diamond, silicon carbide and the like. The particle form shall not specifically be restricted and includes a spherical shape, an ellipsoidal shape, a polyhedral shape, a scale-like shape and the like, and the spherical shape is preferred. The organic abrasion resistance improving agent includes beads of waxes such as polyethylene wax, synthetic resins such as cross-linked acrylic resins, polycarbonate resins and the like. The particle diameter thereof is usually 30 to 200% of the film thickness. Among the above compounds, spherical α-alumina is particularly preferred in terms of a high hardness, a large effect of enhancing the abrasion resistance and relatively easily obtaining the spherical particles.

Used as the polymerization inhibitor are, for example, hydroquinone, p-benzoquinone, hydroquinone monomethyl ether, pyrogallol, t-butyl catechol and the like. Used as the cross-linking agent are, for example, polyisocyanate compounds, epoxy compounds, metal chelate compounds, aziridine compounds, oxazoline compounds and the like.

Used as the filler are, for example, barium sulfate, talc, clay, calcium carbonate, aluminum hydroxide and the like.

Used as the colorant are, for example, publicly known coloring pigments such as quinacridone red, isoindolinone yellow, phthalocyanine blue, phthalocyanine green, titanium oxide, carbon black and the like.

Used as the IR absorbing agent are, for example, dithiol base metal complexes, phthalocyanine base compounds, diimmonium compounds and the like.

Various additives can be added according to the desired physical properties of the surface protective layer 12 obtained by curing the ionizing radiation-curable resin composition according to the present invention to thereby impart various functions, for example, a so-called hard coat function providing a high hardness and an abrasion resistance, a defogging coat function, a stain resistant coat function, a glare-proof coat function, an antireflective coat function, a UV shielding coat function, an IR shielding coat function and the like.

A transparent thermoplastic resin layer 13 laminated, if necessary, on the decorative sheet 10 of the present invention for the purpose of expanding a design effect is selected considering a transparency and a vacuum molding aptitude, and to be representative, it is formed preferably in the form of a single layer sheet of a resin film comprising a thermoplastic resin or a plural layer sheet comprising the same kind of a resin or different kinds of resins.

Preferably used as the thermoplastic resin used for the transparent thermoplastic resin layer 13 are acryl resins, polyolefin base resins such as polypropylene, polyethylene and the like, polycarbonate resins, acrylonitrile-butadiene-styrene resins (hereinafter referred to as ABS resins), polyester resins such as polyethylene terephthalate, polybutylene terephthalate and the like, vinyl chloride resins, cycloolefin resins, polyimide resins and the like. Among them, acryl resins, polypropylene resins, polyethylene resins, polycarbonate resins, ABS resins or polyester resins are preferred in terms of a transparency and a molding property.

The acryl resins include, for example, acryl resins such as polymethyl(meth)acrylate, polyethyl(meth)acrylate, polybutyl(meth)acrylate, methyl(meth)acrylate-butyl(meth)acrylate copolymers, methyl(meth)acrylate-styrene copolymers and the like ((meth)acrylate means acrylate and methacrylate).

A thickness of the transparent thermoplastic resin layer 13 is selected according to the uses, and it is usually 20 to 1,000 μm and preferably 50 to 500 μm considering the cost and the like.

The transparent thermoplastic resin layer 13 according to the present invention can be subjected on one surface or both surfaces thereof, if necessary, to physical or chemical surface treatment by an oxidation method or a roughening method in order to enhance adhesion thereof to a layer provided thereon.

The oxidation method described above includes, for example, corona discharge treatment, chromium oxidation treatment, flame treatment, hot air treatment, ozone/UV ray treatment and the like. The roughening method includes, for example, a sand blast method, a solvent treatment method and the like. The above surface treatments are suitably selected according to the kind of the substrate, and in general, the corona discharge treatment method is preferably used in terms of an effect and an operating property.

Further, the transparent thermoplastic resin layer 13 may be subjected, if necessary, to treatment such as forming a primer layer 17, and coating may be carried out in order to adjust the color, or a pattern may be formed in advance in the form of a print layer 15 from the viewpoint of a design.

A second thermoplastic resin layer 14 laminated, if necessary, on the decorative sheet 10 of the present invention is formed, to be representative, preferably in the form of a single layer sheet of a resin film comprising a thermoplastic resin or a plural layer sheet comprising the same kind of a resin or different kinds of resins. The second thermoplastic resin layer 14 may be provided in the form of a colored thermoplastic resin layer for the purpose of providing a masking property or aiming at a design effect or may be provided in the form of a transparent or translucent thermoplastic resin layer aiming at another design effects.

The thermoplastic resin used for the second thermoplastic resin layer 14 includes the same resins used for the transparent thermoplastic resin layer 13. The coloring agent used for the colored thermoplastic resin layer includes coloring agents used for a print layer described later.

A thickness of the second thermoplastic resin layer 14 is selected according to the uses, and it is usually 20 to 1,000 μm and preferably 50 to 500 μm considering the cost and the like.

The support 11 used for the decorative sheet 10 of the present invention comprises preferably an ABS resin, a polyolefin resin, a styrene resin, an acryl resin, a vinyl chloride resin, a polycarbonate resin and the like. In the polyolefin resin, a polypropylene resin is more preferred. Among the above resins, an ABS resin and a polypropylene resin are more preferred, and an ABS resin is particularly preferred in order to prevent cracks and scratches on the surface of the molded matter. The support 11 is used in order to reinforce the decorative sheet 10 and hold the form of the integrated matter, and therefore it has preferably a thickness of 100 to 500 μm.

As described above, the support 11 may comprise either a single layer or plural layers, and a case of the plural layers includes, for example, a case in which the surface of the support 11 is subjected to blocking-preventing treatment, primer treatment or acid treatment and in which a blocking-preventing layer, a primer layer or an acid-modifying layer is formed on the surface.

Further, in order to provide a design property which can not be displayed only by the print layer 15, a resin layer containing a pigment and a matting agent, for example, a mat resin layer may be formed between the support 11 and the surface protective layer 12.

The print layer 15 laminated if necessary which is shown in FIG. 4 or 5 comprises preferably a picture layer and/or a masking layer.

The picture layer serves for providing the resin molded matter with a decorative property, and it is formed by printing various patterns with an ink using a printer. The patterns include woodgrain patterns, stone-grain patterns imitating the surfaces of rocks such as a marble pattern (for example, travertine marble patterns) and the like, fabric patterns imitating a blanket texture pattern and a cloth-like pattern, tiling patterns, brick work patterns and the like, and they include as well composite patterns thereof such as parquetry patterns, patchwork patterns and the like. The above patterns are formed by multi-color printing with process colors including usual yellow, red, blue and black colors, and in addition thereto, they are formed as well by multi-color printing with special colors using plates of individual colors constituting the patterns.

Materials prepared by appropriately mixing a binder with a colorant such as a pigment and a dye, an extender pigment, a solvent, a stabilizer, a plasticizer, a catalyst, a hardening agent and the like are used as a picture ink used for the picture layer. The above binder shall not specifically be restricted, and optional ones selected from, for example, polyurethane base resins, vinyl chloride/vinyl acetate base copolymer resins, vinyl chloride/vinyl acetate/acryl resin base copolymer resins, chlorinated polypropylene base resins, acryl base resins, polyester base resins, polyamide base resins, butyral base resins, polystyrene base resins, nitrocellulose base resins, cellulose acetate base resins and the like are used alone or in a mixture of two or more kinds thereof.

Used as the colorant are inorganic pigments such as carbon black (Japanese ink), iron black, titanium white, antimony white, chrome yellow, titanium yellow, iron oxide red, cadmium red, ultramarine blue, cobalt blue and the like, organic pigments and dyes such as quinacridone red, isoindolinone yellow, phthalocyanine blue and the like, metallic pigments comprising scale-like foil pieces of aluminum, brass and the like and pearlescent (pearl) pigments comprising scale-like foil pieces of titanium dioxide-coated mica, basic lead carbonate and the like.

In general, the masking layer is a layer provided if necessary, and it is provided in many cases for the purpose of preventing an effect from being exerted on colors of patterns in the decorative sheet by a change and a dispersion in the color of the surface of the support 11. Usually, the masking layer is formed in an opaque color in many cases, and a so-called solid print layer having a thickness of 1 to 20 μm is suitably used as the masking layer. The masking layer is formed by a publicly known printing or coating method such as gravure printing, roll coating and the like.

When the second thermoplastic resin layer 14 described above is laminated as the colored thermoplastic resin layer to provide a masking property, the masking layer as the print layer 15 may not be provide.

In the present invention, an adhesive layer 16 may be provided, if necessary, between the respective layers in order to enhance an adhesive property between the respective layers. As shown in FIGS. 4 and 5, for example, adhesive layers 16, 16b can be provided between the support 11 and the print layer 15 in order to enhance an adhesive property between the support 11 and the print layer 15. Further, as shown in FIG. 5, an adhesive layer 16a can be provided, if necessary, between the transparent thermoplastic resin layer 13 and the print layer 15 in order to enhance an adhesive property between the transparent thermoplastic resin layer 13 and the print layer 15.

A thermoplastic resin or a thermosetting resin is used for the adhesive layer depending on the injection resin. The thermoplastic resin includes acryl resins, acryl-modified polyolefin resins, chlorinated polyolefin resins, vinyl chloride-vinyl acetate copolymers, thermoplastic urethane resins, thermoplastic polyester resins, polyamide resins, rubber base resins and the like. They can be used alone or in a mixture of two or more kinds thereof. Further, the thermoplastic resin includes urethane resins (for example, two-component curing type comprising an isocyanate curing agent and various polyols), epoxy resins and the like.

A thickness of the adhesive layer may be a suited thickness according to the required physical properties and the like, and it is usually 1 to 100 μm. A forming method of the adhesive layer shall not specifically be restricted, and it is usually formed by a publicly known printing or coating method such as gravure printing, roll coating and the like, wherein an ink or a coating liquid comprising a resin liquid obtained by diluting the resins described above with a diluent solvent is used. Other auxiliary materials, for example, various additives such as extender pigments and the like may further be added, if necessary, to the adhesive layer in order to control or enhance various physical properties such as a printing (or coating) aptitude and the like in the ink (or the coating liquid).

In the present invention, a primer layer 17 can suitably be provided in order to enhance an adhesive property between the surface protective layer 12 and the transparent thermoplastic resin layer 13. A material for the above primer layer 17 which is provided if necessary includes, for example, acryl resins, urethane resins (for example, two-component curing type comprising an isocyanate curing agent and various polyols), acryl urethane resins, vinyl chloride-vinyl acetate copolymers, ethylene-vinyl acetate copolymers and the like. Two-component curable urethane resins are preferred from the viewpoints that an adhesive property between the surface protective layer 12 and the transparent thermoplastic resin layer 13 as well as a weatherability thereof are enhanced and that the adhesive property is scarcely reduced with the passage of time.

The surface protective layer 12 can be formed by preparing a coating liquid containing the foregoing ionizing radiation-curable resin composition according to the present invention and coating the above coating liquid on the surface of the support 11 or the transparent thermoplastic resin layer 13 or via the primer layer 17 to cross-link and cure it. A viscosity of the above coating liquid shall not specifically be restricted as long as it is a viscosity at which an uncured resin layer can be formed on a surface of the substrate by a coating method described later.

In the present invention, the coating liquid prepared is applied on a surface of the transparent thermoplastic resin layer 13 by a publicly known method such as gravure coating, bar coating, roll coating, reverse roll coating, comma coating and the like, preferably gravure coating so that the thickness described above is obtained after cured, whereby an uncured resin layer is formed.

In the present invention, the uncured resin layer thus formed is irradiated with an ionizing radiation such as an electron beam, a UV ray and the like to cure the above uncured resin layer. In this regard, when an electron beam is used as the ionizing radiation, an acceleration voltage thereof can suitably be selected according to the resin used and a thickness of the layer, and the uncured resin layer is preferably cured at an acceleration voltage of usually 70 to 300 kV.

In irradiation of the electron beam, the higher the acceleration voltage is, the more the penetrability of the electron beam is increased, and therefore when a resin which is deteriorated by an electron beam is used for the transparent thermoplastic resin layer 13, the acceleration voltage is selected so that a depth of penetration of the electron beam is substantially the same as a thickness of the resin layer, whereby the electron beam can be inhibited from being irradiated excessively onto the transparent thermoplastic resin layer 13, and deterioration of the resin caused by irradiation with an excessive amount of the electron beam can be allowed to stay in a minimum level.

An irradiation dosage of the electron beam is preferably an amount in which a cross-linking density of the resin layer is saturated, and it is selected in a range of usually 5 to 300 kGy (0.5 to 30 Mrad), preferably 10 to 50 kGy (1 to 5 Mrad).

Further, the electron beam source shall not specifically be restricted, and capable of being used are various electron beam accelerators such as a Cockroft-Walton type accelerator, a Van de Graft type accelerator, a resonance transformer type accelerator, an insulating core transformer type accelerator, a linear type accelerator, a Dynamitron type accelerator, a high frequency type accelerator and the like.

When a UV ray is used as the ionizing radiation, the radiation containing a UV ray having a wavelength of 190 to 380 nm is radiated. The UV ray source shall not specifically be restricted, and used are, for example, a high pressure mercury lamp, a low pressure mercury lamp, a metal halide lamp, a carbon arc lamp and the like.

In the case of FIG. 1, the decorative sheet 10 for three-dimensional processing according to the present invention can be produced by a method in which the surface protective layer 12 is printed or coated on the surface of the support 11.

In the case of FIG. 3, the surface protective layer 12 is laminated, for example, on the surface of the transparent thermoplastic resin layer 13, and the second thermoplastic resin layer 14 and the support 11 are laminated in order on the rear surface thereof.

In the case of FIG. 4, the primer layer 17 is laminated, for example, on the surface side of the transparent thermoplastic resin layer 13, and the surface protective layer 12 is further laminated on the surface thereof. In addition thereto, the print layer 15, that is, the picture layer and/or the masking layer are laminated in order on the rear surface side of the transparent thermoplastic resin layer 13. Thereafter, the adhesive layer 16 is laminated on the print layer 15, and then the support 11 is laminated thereon.

One example of a production method in a case where the second thermoplastic resin layer 14 is provided as is the case with FIG. 5 shall be shown. As is the case with FIG. 4, the primer layer 17 is laminated on the surface side of the transparent thermoplastic resin layer 13, and the surface protective layer 12 is further laminated on the surface thereof. Also, the print layer 15 is laminated on the surface side of the second thermoplastic resin layer 14, and the adhesive layer 16a is further laminated on the surface thereof. Then, the rear surface side of the transparent thermoplastic resin layer 13 and the adhesive layer 16a on the surface side of the second thermoplastic resin layer 14 are stuck together with a laminate and the like. Thereafter, the adhesive layer 16b is laminated on the rear surface side of the second thermoplastic resin layer 14 by coating, and it is stuck on the support 11.

Usually, when the transparent thermoplastic resin layer 13 or the surface protective layer 12 and the support 11 comprise the same resin material in, for example, FIG. 2, 3 or 5, the adhesive layer 16 is not required in a certain case. Further, when the transparent thermoplastic resin layer 13 and the second thermoplastic resin layer 14 comprise the same resin material in, for example, FIG. 3, the adhesive layer 16 is not required in a certain case.

The coating order described above may suitably be changed for the sake of convenience in the production.

The laminations described above are carried out by a publicly known printing or coating method such as gravure printing, roll coating and the like.

In an insert molding method which is suited as a three-dimensional processing method using the decorative sheet 10 of the present invention, the decorative sheet 10 of the present invention is vacuum-molded in advance into a surface form of the molded matter by means of a vacuum molding die in a vacuum molding step, and then excess parts are trimmed, if necessary, to obtain a molded sheet. This molded sheet is inserted into an injection molding die to clamp the injection molding die, and a resin staying in a fluid state is injected into the die and then solidified. The decorative sheet is integrated with an outer surface of the resin molded matter to produce a decorative resin molded matter.

Resins according to the uses are used as the injection resin, and thermoplastic resins including polyolefin base resins such as polyethylene, polypropylene and the like, ABS resins, styrene resins, polycarbonate resins, acryl resins, vinyl chloride resins and the like are representative. Further, thermosetting resins such as urethane resins, epoxy resins and the like can be used as well according to the uses.

The decorative resin molded matter thus produced does not have cracks and breaks produced on a surface in a molding step, and the surface thereof has a high abrasion resistance and a high solvent resistance. Further, in the production process of the present invention, the surface protective layer is completely cured in a production stage of the decorative sheet, and therefore a step for cross-linking and curing the surface protective layer after producing the decorative resin molded matter is not required.

EXAMPLES

Next, the present invention shall be explained in further details with reference to examples, but the present invention shall by no means be restricted by these examples.

A molding property, a breaking elongation, a storage elastic modulus E' of the surface protective layer at 140° C., an abrasion resistance, a solvent resistance and a die release property of the decorative sheet were measured according to the following methods.

(1) Molding Property:

The decorative sheets obtained in the respective examples and comparative examples were subjected to insert molding by a method shown below and evaluated by appearances thereof after molding. The evaluation criteria are shown below.

○: nothing abnormal in appearance
Δ: slight change in gloss or cracks produced in a large part of a three-dimensional form part or a 300% stretched part
×: marked change in gloss or cracks produced in a whole part of a stretched part Inset Molding:

The decorative sheet was heated at 140 to 160° C. by means of an infrared heater and softened. Next, a die having the same form as that of a female die for injection molding was used to carry out vacuum molding, and it was molded to an inside form of the die. The decorative sheet was released from the die, and unnecessary parts were trimmed to obtain a molded sheet. This molded sheet was inserted into an injection molding die to clamp the injection molding die, and a heat resistant ABS resin staying in a fluid state was injected into the die at an injection resin temperature of 230° C. and then solidified to produce a decorative resin molded matter.

(2) Breaking Elongation:

A stretching property of the decorative sheet 10 of the present invention is affected by a stretching property of the support 11 to a large extent, and therefore a tensile test according to JIS K 7127 was carried out at temperature higher by 40° C. than a thermal deformation temperature of the support measured by an ASTM D648 method to determine the breaking elongation according to the following equation, wherein an initial length of a sample piece of the decorative sheet was set to $L_0$, and a length of the sample piece when visible cracks were produced on the sample piece of the decorative sheet or when the sample piece was broken (a case in which the sample piece was broken without producing cracks) was set to $L_1$:

$$\text{breaking elongation (\%)} = [(L_1 - L_0) \times 100]/L_0$$

Measuring conditions: the sample piece having a width of 25 mm and a length of 120 mm was used, and the conditions were a drawing speed of 50 mm/minute, a chuck-to-chuck distance of 80 mm and a marked line-to-marked line distance of 50 mm.

When the support had plural layers, the thickest layer was regarded as the support to set up a measuring temperature condition.

(3) Storage Elastic Modulus E':

The resin compositions produced in the respective examples and comparative examples were coated on a polyethylene terephthalate (hereinafter referred to as PET) film which was not subjected to surface treatment so that a film thickness after cross-linked and cured was about 15 μm. The above uncured resin layer was irradiated with an electron beam having an acceleration voltage of 165 kV and an irradiation dose of 50 kGy (5 Mrad) to cure the electron beam-curable resin composition. The cured film was peeled off from the PET film, and a test piece having a width of 10 mm and a length of 20 mm was cut out therefrom. The above test piece was used to measure a storage elastic modulus E' at 140° C. according to JIS K7244-1 and 7244-4 by means of a dynamic viscoelasticity measuring apparatus ("RSA II" manufactured by Rheometric Scientific FE Co., Ltd.). It was measured at a clamp-to-clamp distance of 10 mm, an initiation temperature of 30° C., a termination temperature of 180° C., a heating rate of 5° C./Minute and a measuring frequency of 1 Hz.

(4) Abrasion Resistance:

The decorative sheets produced in the respective examples and comparative examples were subjected to a test (load—500 g, 100 times) according to JIS L0849 (abrasion tester II type (Color Fastness Rubbing Tester)) to evaluate an abrasion resistance according to the following criteria. An equipment used for the test is Color Fastness Rubbing Tester manufactured by Tester Sangyo Co., Ltd. The evaluation criteria are shown below.

○: no scratching
×: scratching or gloss change was caused (5) Solvent Resistance:

An ethanol 50% aqueous solution was dropped on the surface of the decorative sheet and then wiped off after one minute passed, and the presence of a change in a coating film of the surface protective layer was visually judged to evaluate a solvent resistance according to the following criteria.

○: no change
×: change observed (6) Die Release Property:

A die release property of the molded matter after vacuum molding and a die release property of the molded matter after injection molding were evaluated. A case in which when the die was taken out from the die, wrinkles, blisters, peelings and the like were not visually observed on the surface protective layer to bring about no problems in terms of appearance was rated as good (○), and a case in which die release was inferior and in which wrinkles, blisters, peelings and the like were visually observed on the surface protective layer to bring about problems in terms of appearance was rated as inferior (×). Molding was carried out so that the die and the surface protective layer were disposed oppositely, and a die release property of the vacuum-molded matter was evaluated.

Examples 1 and 2 and Comparative Examples 1 to 4

Tetrafunctional urethane acrylate 33 weight parts which was an electron beam-curable resin (hereinafter referred to as "EB") was mixed with a copolymer (hereinafter referred to as "PMMA-1", weight average molecular weight (Mw): $1.0 \times 10^5$, number average molecular weight (Mn): $0.60 \times 10^5$) 67 weight parts of methyl methacrylate (MMA) and methyl acrylate (MA) in a mole ratio 100:5 to obtain an electron beam-curable resin composition. A weight ratio of EB to PMMA-1 was 33:67.

Next, an acryl urethane base primer 1 μm was formed by gravure coating on a surface of a support comprising a colored ABS resin sheet having a thickness of 400 μm in which a thermal deformation temperature measured by an ASTM D648 method was 80° C., and the electron beam-curable resin composition described above was coated on the primer-coated surface by gravure coating so that values described in Table 1 were obtained. The above uncured resin layer was irradiated with an electron beam having an acceleration voltage of 165 kV and an irradiation dose of 50 kGy (5 Mrad) to cure the electron beam-curable resin composition and form a surface protective layer, whereby a decorative sheet for three-dimensional processing was obtained.

A molding property, a breaking elongation, a storage elastic modulus E' of the surface protective layer at 140° C., an abrasion resistance, a solvent resistance and a die release property of six kinds of the decorative sheets thus obtained were evaluated according to the methods described above. The results thereof are shown in Table 1.

Examples 3 to 8

A print layer was formed on a transparent thermoplastic resin layer shown in Table 1. In Examples 3, 4, 7 and 8, the same acryl urethane base primer as in Examples 1 and 2 was coated on the transparent thermoplastic resin layer at a side opposite to the print layer by gravure coating to form a primer layer, and the electron beam-curable resin composition shown in Table 1 was coated on the primer layer by gravure coating. Further, in Examples 5 and 6, the electron beam-curable resin composition shown in Table 1 was coated on the transparent thermoplastic resin layer at a side opposite to the print layer by gravure coating without forming a primer layer. The above uncured resin layers were irradiated with an electron beam having an acceleration voltage of 165 kV and an irradiation dose of 50 kGy (5 Mrad) to cure the electron beam-curable resin compositions and form surface protective layers.

Next, a two-component curable urethane resin adhesive was coated on the print layer to form an adhesive layer, and it was adhered to a support comprising the same colored ABS resin sheet as in Examples 1 and 2. The sheet thus obtained was cured at 40° C. for 3 days to accelerate curing of the adhesive layer 16b, whereby a decorative sheet 10 was obtained.

A molding property, a breaking elongation, a storage elastic modulus E' of the surface protective layer at 140° C., an abrasion resistance, a solvent resistance and a die release property of six kinds of the decorative sheets thus obtained were evaluated according to the methods described above. The results thereof are shown in Table 1.

Example 9

A print layer was formed on a surface of a second thermoplastic resin layer 14 which was a colored polypropylene film having a thickness of 60 μm, and on the other hand, a two-component curable urethane resin adhesive was coated in a thickness of about 5 μm on a surface of a transparent thermoplastic resin layer 13 which was a transparent polypropylene film having a thickness of 60 μm by gravure coating to form an adhesive layer 16a.

Next, a print layer side on the second thermoplastic resin layer 14 was adhered onto an adhesive layer 16a side on the transparent thermoplastic resin layer 13. The same acryl urethane base primer as in Examples 1 and 2 was coated on the surface of the transparent thermoplastic resin layer 13 of the laminated matter thus obtained by gravure coating to form a primer layer, and the electron beam-curable resin composition shown in Table 1 was coated on the primer layer by gravure coating. The above uncured resin layer was irradiated with an electron beam having an acceleration voltage of 165 kV and an irradiation dose of 50 kGy (5 Mrad) to cure the electron beam-curable resin composition and form a surface protective layer.

A two-component curable urethane resin adhesive was coated on a second thermoplastic resin layer 14 side of the laminated matter obtained by gravure coating to form an adhesive layer 16b having a thickness of 10 μm, and it was adhered to a support comprising the same colored ABS resin sheet as in Examples 1 and 2. The sheet thus obtained was cured at 40° C. for 3 days to accelerate curing of the adhesive layer 16b, whereby a decorative sheet 10 was obtained.

A molding property, a breaking elongation, a storage elastic modulus E' of the surface protective layer at 140° C., an abrasion resistance, a solvent resistance and a die release property of six kinds of the decorative sheets thus obtained in Example 9 were evaluated according to the methods described above. The results thereof are shown in Table 1.

In this regard, ES is tetrafunctional urethane acrylate; PMMA-1 is described above; PMMA-2 is a methyl methacrylate (MMA) homopolymer (weight average molecular weight (Mw): $1.1 \times 10^5$, number average molecular weight (Mn): $0.64 \times 10^5$, degree of polydispersion (Mw/Mn); 1.72); and polyester-1 is a polyester resin (weight average molecular weight (Mw): $0.86 \times 10^5$, number average molecular weight (Mn): $0.41 \times 10^5$, degree of polydispersion (Mw/Mn): 2.1).

As can be found from Table 1, the decorative sheets prepared in Examples 1 to 9 are excellent in all of a molding property, a breaking elongation, an abrasion resistance and a solvent resistance, and a storage elastic modulus E' of the surface protective layer at 140° C. fell in a range of $7.7 \times 10^5$ to $1.2 \times 10^8$ Pa.

TABLE 1

|  | Example |  |  |  |  |  |  |  |  | Comparative Example |  |  |  |
|---|---|---|---|---|---|---|---|---|---|---|---|---|---|
|  | 1 | 2 | 3 | 4 | 5 | 6 | 7 | 8 | 9 | 1 | 2 | 3 | 4 |
| Thickness of surface protective layer (μm) | 0.9 | 4.5 | 3.0 | 3.0 | 3.0 | 3.0 | 6.0 | 6.0 | 3.0 | 0.1 | 7.2 | 9.0 | 13.5 |
| Material of surface protective layer | A | A | B | C | C | B | B | C | B | A | A | A | A |
| Presence and thickness of primer layer (μm) | 1 | 1 | 1 | 1 | None | None | 1 | 1 | 1 | 1 | 1 | 1 | 1 |
| Presence and thickness of transparent thermoplastic resin layer (μm) | None | None | 60 | 60 | 75 | 75 | 100 | 100 | 60 | None | None | None | None |
| Material of transparent thermoplastic resin layer | — | — | D | D | E | E | D | D | D | — | — | — | — |
| Presence and thickness of adhesive layer (μm) | None | None | None | None | None | None | None | None | 5 | None | None | None | None |
| Presence of adhesive layer | None | None | Present | Present | Present | Present | Present | Present | Present | None | None | None | None |
| Presence and thickness of second thermoplastic resin layer (μm) | None | None | None | None | None | None | None | None | 60 | None | None | None | None |
| Presence and thickness of adhesive layer (μm) | None | None | 10 | 10 | 10 | 10 | 10 | 10 | 10 | None | None | None | None |
| Thickness of support (μm) | 400 | 400 | 400 | 400 | 400 | 400 | 400 | 400 | 400 | 400 | 400 | 400 | 400 |
| Molding property | ○ | ○ | ○ | ○ | ○ | ○ | ○ | ○ | ○ | ○ | Δ | Δ | X |
| Breaking elongation | 387< | 387< | 387< | 387< | 387< | 387< | 387< | 387< | 387< | 387< | 120 | 100 | 90 |
| Storage elastic modulus E' of surface protective layer (140° C.) (Pa) | $8.3 \times 10^6$ | $8.3 \times 10^6$ | $3.1 \times 10^6$ | $2.3 \times 10^6$ | $2.3 \times 10^6$ | $3.1 \times 10^6$ | $3.1 \times 10^6$ | $2.3 \times 10^6$ | $3.1 \times 10^6$ | $8.3 \times 10^6$ | $8.3 \times 10^6$ | $8.3 \times 10^6$ | $8.3 \times 10^6$ |
| Abrasion resistance | ○ | ○ | ○ | ○ | ○ | ○ | ○ | ○ | ○ | X | X | X | X |
| Solvent resistance | ○ | ○ | ○ | ○ | ○ | ○ | ○ | ○ | ○ | X | ○ | ○ | ○ |
| Die release property | ○ | ○ | ○ | ○ | ○ | ○ | ○ | ○ | ○ | ○ | ○ | ○ | ○ |

Remarks:

In the breaking elongation (%), "387<" shows that the test was finished after it was confirmed that the breaking elongation exceeded 387%.

Composition contents of the materials A to C of the surface protective layer and the materials D to E of the transparent thermoplastic resin layer:

material A of the surface protective layer: (EB/PMMA-1)= (33/67) (weight parts)

material B of the surface protective layer: (EB/PMMA-2)= (33/67) (weight parts)

material C of the surface protective layer: (EB/polyester-1)=(25/75) (weight parts)

material D of the transparent thermoplastic resin layer: polypropylene resin non-stretched polypropylene (propylene-ethylene random copolymer), softening point: 125° C., haze (cloudiness value): 7.0 material E of the transparent thermoplastic resin layer: acryl resin methyl methacrylate resin (PMMA), softening point: 105° C., haze (cloudiness value): 0.5

In contrast with this, in the decorative sheet prepared in Comparative Example 1, a storage elastic modulus E' of the surface protective layer at 140° C. fell in a range of $7.7 \times 10^5$ to $1.2 \times 10^8$ Pa, and the breaking elongation was high. However, a thickness of the surface protective layer was too small, and therefore both of the abrasion resistance and the solvent resistance were inferior.

Further, in the decorative sheets prepared ire Comparative Examples 2 to 4, a storage elastic modulus E' of the surface protective layer at 140° C. fell in a range of $7.7 \times 10^5$ to $1.2 \times 10^8$ Pa, and the solvent resistance was good. However, the breaking elongation was low, and the abrasion resistance was inferior as well.

Further, a die release property of the molded matter after vacuum molding and a die release property of the molded matter after injection molding were evaluated to result in finding that both of the die release properties after vacuum molding and after injection molding were good in Examples 1 to 9 and Comparative Examples 1 to 4.

INDUSTRIAL APPLICABILITY

The decorative sheet for three-dimensional processing according to the present invention is suitably used for decorative molded matters in uses such as interior materials or exterior materials for vehicles such as cars, fixture members such as base boards, dressed lumbers and the like, fittings for window frames, door frames and the like, interior materials for buildings such as walls, floors, ceilings and the like, housings for home electric appliances such as TV receivers, air conditioners and the like, vessels and the like.

What is claimed is:

1. A decorative sheet, comprising:
a support; and
at least a surface protective layer laminated on the support, wherein
the decorative sheet is suitable for three-dimensional processing,
the decorative sheet has a breaking elongation (according to JIS K 7127) exceeding 300% at a temperature higher by 40° C. than a thermal deformation temperature of the support, measured by an ASTM D648 method, and
the surface protective layer is obtained by cross-linking and curing an ionizing radiation curable resin composition and has a film thickness of 0.2 to 6.0 μm, wherein the ionizing radiation curable resin composition comprises an ionizing radiation curable resin and a thermoplastic resin in a ratio (weight ratio) of 75:25 to 20:80.

2. The decorative sheet of claim 1, wherein the surface protective layer has a storage elastic modulus in a range of 7.7×105 to 1.2×108 Pa at 140° C.,
as measured on-a sheet having a width of 10 mm and a thickness of 15 μm, produced by cross-linking and curing the above ionizing radiation curable resin composition, at a cramp-to-cramp distance of 10 mm, with an initial temperature of 30° C., a final temperature of 180° C., a heating rate of 5° C./minute, and a measuring frequency of 1 Hz according to JIS K7244-1 and K7244-4.

3. The decorative sheet of claim 1, further comprising a transparent thermoplastic resin layer, provided between the support and the surface protective layer.

4. The decorative sheet of claim 3, further comprising a second thermoplastic resin layer, provided between the support and the transparent thermoplastic resin layer.

5. The decorative sheet of claim 1, wherein the ionizing radiation curable resin composition is an electron beam curable resin.

6. The decorative sheet of claim 1, wherein the three-dimensional processing is insert molding.

7. A decorative resin molded matter comprising the decorative sheet of claim 1.

8. The decorative sheet of claim 2, further comprising a transparent thermoplastic resin layer, provided between the support and the surface protective layer.

9. The decorative sheet of claim 8, further comprising a second thermoplastic resin layer, provided between the support and the transparent thermoplastic resin layer.

10. The decorative sheet of claim 3, wherein the ionizing radiation curable resin composition is an electron beam curable resin.

11. The decorative sheet of claim 8, wherein the ionizing radiation curable resin composition is an electron beam curable resin.

12. The decorative sheet of claim 1, wherein the support comprises at least one resin selected from the group consisting of an ABS resin, a polyolefin resin, a styrene resin, an acryl resin, a vinyl chloride resin, and a polycarbonate resin.

13. The decorative sheet claim 2, wherein the ionizing radiation curable resin composition comprises an ionizing radiation curable resin and a thermoplastic resin in a ratio (weight ratio) of 60:40 to 20:80.

14. The decorative sheet of claim 13, further comprising a transparent thermoplastic resin layer, provided between the support and the surface protective layer.

15. The decorative sheet of claim 14, further comprising a second thermoplastic resin layer, provided between the support and the transparent thermoplastic resin layer.

16. The decorative sheet of claim 13, wherein the ionizing radiation curable resin composition is an electron beam curable resin.

17. The decorative sheet of claim 14, wherein the ionizing radiation curable resin composition is an electron beam curable resin.

* * * * *